(12) United States Patent
Mottahedeh

(10) Patent No.: US 7,841,850 B2
(45) Date of Patent: Nov. 30, 2010

(54) METHOD AND APPARATUS FOR SHAPING THERMOPLASTIC PROFILES

(76) Inventor: Soheyl Mottahedeh, 216-415 Westview Street, Coquitlam, British Columbia (CA) V3K 6B7

( * ) Notice: Subject to any disclaimer, the term of this patent is extended or adjusted under 35 U.S.C. 154(b) by 496 days.

(21) Appl. No.: 11/975,883

(22) Filed: Oct. 22, 2007

(65) Prior Publication Data

US 2009/0102090 A1     Apr. 23, 2009

(51) Int. Cl.
*B29C 53/08* (2006.01)

(52) U.S. Cl. .................... 425/296; 264/209.3; 264/285; 264/339; 425/319; 425/325; 425/384; 425/391; 425/403.1

(58) Field of Classification Search ................. 425/296, 425/319, 325, 384, 391, 403.1; 264/209.3, 264/285, 403.1, 339
See application file for complete search history.

(56) References Cited

U.S. PATENT DOCUMENTS

| | | | |
|---|---|---|---|
| 4,029,452 A | | 6/1977 | Schippers et al. |
| 4,273,523 A | * | 6/1981 | Levens ..................... 425/326.1 |
| 5,123,827 A | | 6/1992 | Lupke |
| 5,424,023 A | * | 6/1995 | Riley et al. ................. 264/560 |
| 5,945,052 A | | 8/1999 | Schryver et al. |
| 6,129,885 A | | 10/2000 | Klein |
| 6,190,595 B1 | * | 2/2001 | Thoms et al. .......... 264/177.16 |
| 6,209,607 B1 | | 4/2001 | Foos |
| 6,394,141 B2 | | 5/2002 | Wages et al. |
| 6,838,041 B2 | | 1/2005 | Rowley |
| 6,952,942 B2 | * | 10/2005 | Graefe et al. ................. 72/256 |

FOREIGN PATENT DOCUMENTS

CA    2512411    1/2007

OTHER PUBLICATIONS http://archmaster.eu, webpage dated Oct. 22, 2007.
www.pipecoil.co.uk/html/plumbing.htm, webpage dated Oct. 22, 2007.
www.arcbends.com, webpage dated Oct. 22, 2007.

* cited by examiner

*Primary Examiner*—Yogendra N Gupta
*Assistant Examiner*—Joseph Leyson

(57) ABSTRACT

An apparatus and method for producing elongate variably shaped bodies at least partially comprising thermoplastic material a profile is extruded from an extrusion system head and engaged in a flexible conduit created by cavities formed inside a series of calibration plates attached flexibly together. The calibration plates slide freely over a rotating mold to adopt the shape of the mold's outer contour. The profile is driven through the flexible conduit and winded around the rotating mould like coils. In an embodiment of the apparatus and method, the profile is winded around a size-variable mould creating three-dimensional objects in real time.

17 Claims, 17 Drawing Sheets

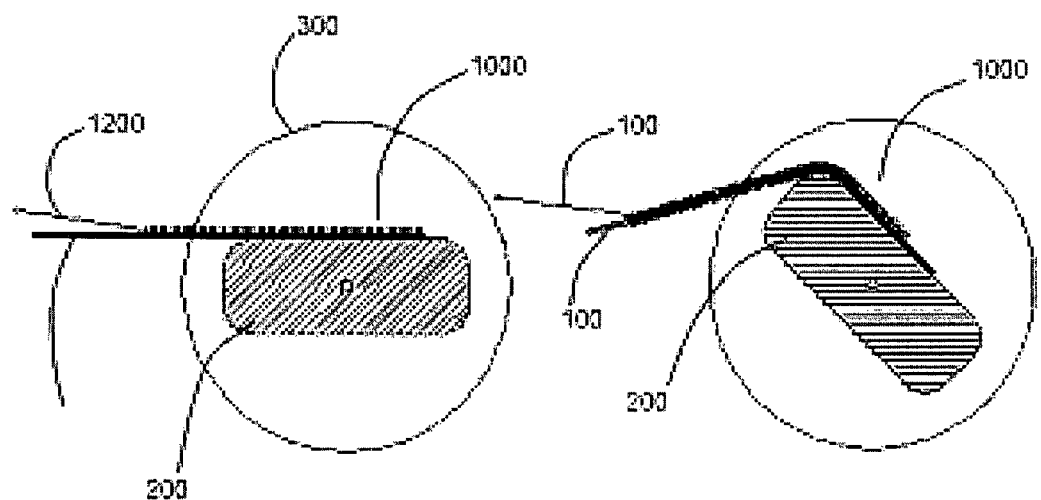
FIG. 2-A     FIG. 2-B
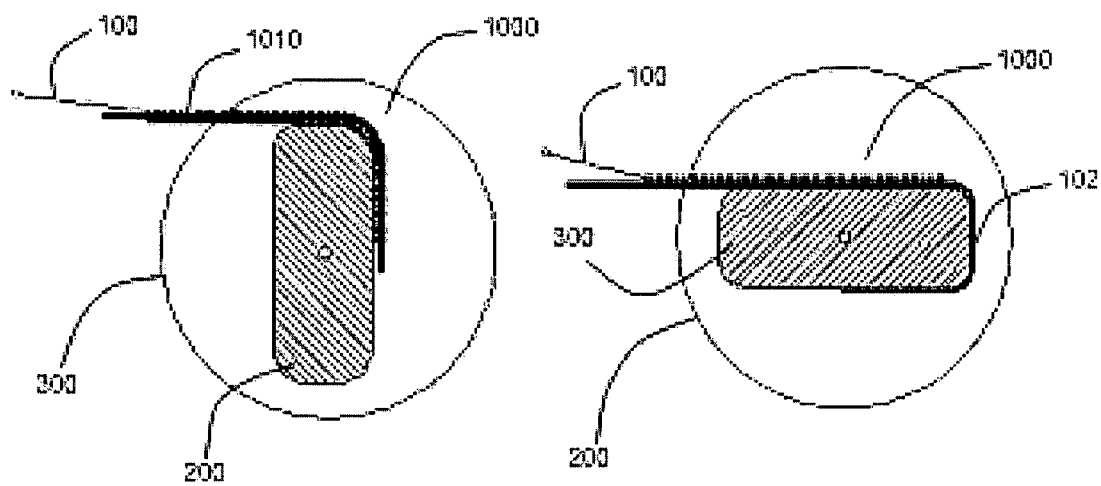
FIG. 2-C     FIG. 2-D

PRIOR ART

METHOD AND APPARATUS FOR SHAPING THERMOPLASTIC PROFILES

FIELD OF THE INVENTION

Disclosed in the present application is an apparatus and method for shaping thermoplastic profiles. The apparatus and method relate to variably shaping extruded profiles in a continuous manner, inline with an extrusion process. The principles of the apparatus and method also apply to post-extrusion processes.

BACKGROUND OF INVENTION

Extruded thermoplastic profiles are commonly used in every sector of human life. Extruded profiles are usually supplied in linear form. Currently bending of extruded profiles such as plastic pipes or arched plastic window frames is done in post-extrusion environments where a pre-determined length of linear-shaped profile is re-heated and gradually bent into a desired shape. Such methods of bending and shaping of profiles are labor intensive and therefore costly, and limit profiles utility. Production costs further increase if some level of complexity is introduced in the geometry of the profile.

Spiral welding machines for wrapping a hot strip of metal or plastic material around a constant-diameter coiler to form a pipe or a tank are known technology. However, wrapping a bulky profile of complex cross-sectional geometry around a mold of uneven geometry (rectangular, triangular, trapezoidal) and maintaining continuously the inner and outer cross-sectional dimensions of that same bulky profile substantially constant during bending so that the walls of the profile do not collapse has been a challenge. Furthermore, accomplishing all the above activities in an economic manner is an even greater challenge.

Accordingly, it is desirable to develop a cost-effective apparatus and method for bending and shaping extruded thermoplastic profiles, preferably inline with an extrusion process. It is also desirable that the method accommodates all profile configurations and all types of malleable products ranging from thermoplastics to organic minerals that are extrudable and that can solidify outside the extruder under the effect of cold, heat, or chemical treatment.

To address some of these requirements, Rowly disclosed in U.S. Pat. No. 6,838,041 a post-formation processing method for extruded or injection molded profiles requiring the sealing of one end of a tubular object, applying internal pressure from inside and creating a vacuum from the outside. Similarly, Klein disclosed in U.S. Pat. No. 6,129,885 a post-extrusion method using a combination extrusion and blow molding method to impart a shape to a pipe-shape profile. Archmaster, a company with a website (http://archmaster.eu)—visited on Dec. 22, 2006—disclosed manually operated equipment for bending profiles. Archmaster uses—as shown in the attached drawing labeled FIG. 10 (hereinafter "figure ten")—multiple flexible plastic blocks that are fitted around a profile to protect the profile's cross-sectional deformations during bending. This manual post-extrusion method is slow and labor intensive. Another company Pipe Coil Technology Limited with a website (www.pipecoil.co.uk/html/plumbing.htm)—visited on Dec. 22, 2006—disclosed a coiling solution for plumbing pipes. Another company named Pipestar International offers on the internet at www.arcbends.com, pipefittings, and sweep bends. Pipestar uses a post-extrusion process involving the heating of a fixed-length linear pipe and uses jigs to bend it.

While prior art provides a partial solution to the problem of bending thermoplastic profiles, the prior art suffers from the disadvantages of providing only post-extrusion methods that are all labor-intensive and are limited in the ability to bend thermoplastic profiles of complex geometries in a cost-effective manner.

SUMMARY OF THE INVENTION

The apparatus and method provide a cost-effective approach of bending and shaping in a continuous manner extruded profiles inline with an extrusion process.

The apparatus and method also provide a process for fabricating elongate curved bodies using means that are simple in terms of manufacturing, handling, and quick set-up time, so that elongate curved bodies' costs can be largely disregarded.

Furthermore, the apparatus and method also provide fabrication of partially curved profiles, such as elbows or fully closed bodies, such as window-like frames, made inline with a continuous extrusion process.

The apparatus and method also provide a simple process for producing elongate curved bulky bodies by winding a profile around a rotating mold to impart to the profile the longitudinal dimensions of the mold outer contour while maintaining the profile cross-sectional dimensions substantially constant.

The apparatus and method produce elongate curved bodies made of profiles of any cross-sectional geometry, hollow or not, made of thermoplastic, organic or other extrudable materials that can be handled in a controlled manner, wherein firstly a profile is extruded from an extrusion head of an extrusion system and drawn in-between multiple series of calibration plates flexibly held together by cables, with said series of plates positioned to freely slide over the surface of a rotating mold which outer contour defines the final shape of the bodies to be shaped.

For thermoplastic profiles, the shaped bodies may be cooled to solidify before being cut and moved away. For profiles made of clay-type ceramics and other organic pastes, the shaped bodies may be heated or vented to solidify. On a side note, the heat for shaping thermoplastic profiles inline with an extrusion process comes from the retained latent heat originated from the melting of the granules inside the extruder that produced the profile.

In one embodiment, the mold outer contour is provided with radial moveable parts activated by drive means for changing the configuration of the mold outer contour.

Thus, bodies created by such a size-variable mold can take longitudinally variable sizes given to the profile. Depending on the size of the final shape of the object or body to be created, the mold can be positioned vertically, horizontally next to the ground or obliquely at any angle.

Furthermore, three-dimensional bodies can be created in real-time by attaching the adjacent longitudinal edges of coiled profiles together.

The above principles may also apply to post-extrusion processes by adding further an external source of heat and a conveyor system to move forward in a continuous way—line after line—fixed-lengths of linear profiles.

BRIEF DESCRIPTION OF DRAWINGS

The apparatus may take form in various components and arrangements of components; and the method may apply various steps and arrangements of steps. The drawings are only for purposes of illustrating preferred embodiments of the method and apparatus and are not to be construed as limiting the same. The below detailed description of the preferred embodiments is in conjunction with appended drawings, wherein like reference numerals refer to like elements in figures, and wherein:

figure one (labeled "FIG. 1" in the drawings) is a perspective view of an embodiment of an inline bending apparatus which includes a series of calibration plates, a mold mounted to a horizontal-axis turn-table, a conditioning system, a cutting device and a receptacle system;

Figure 1:
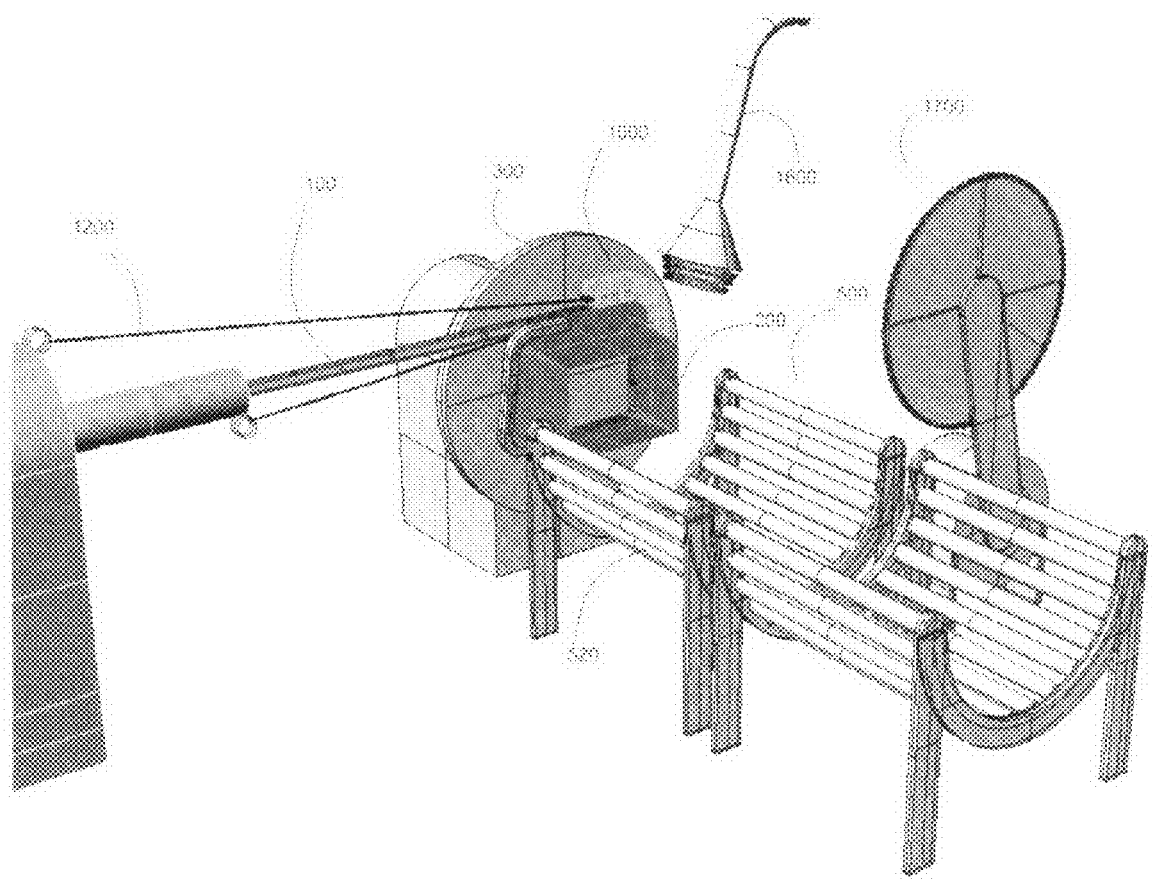
Figure 3:
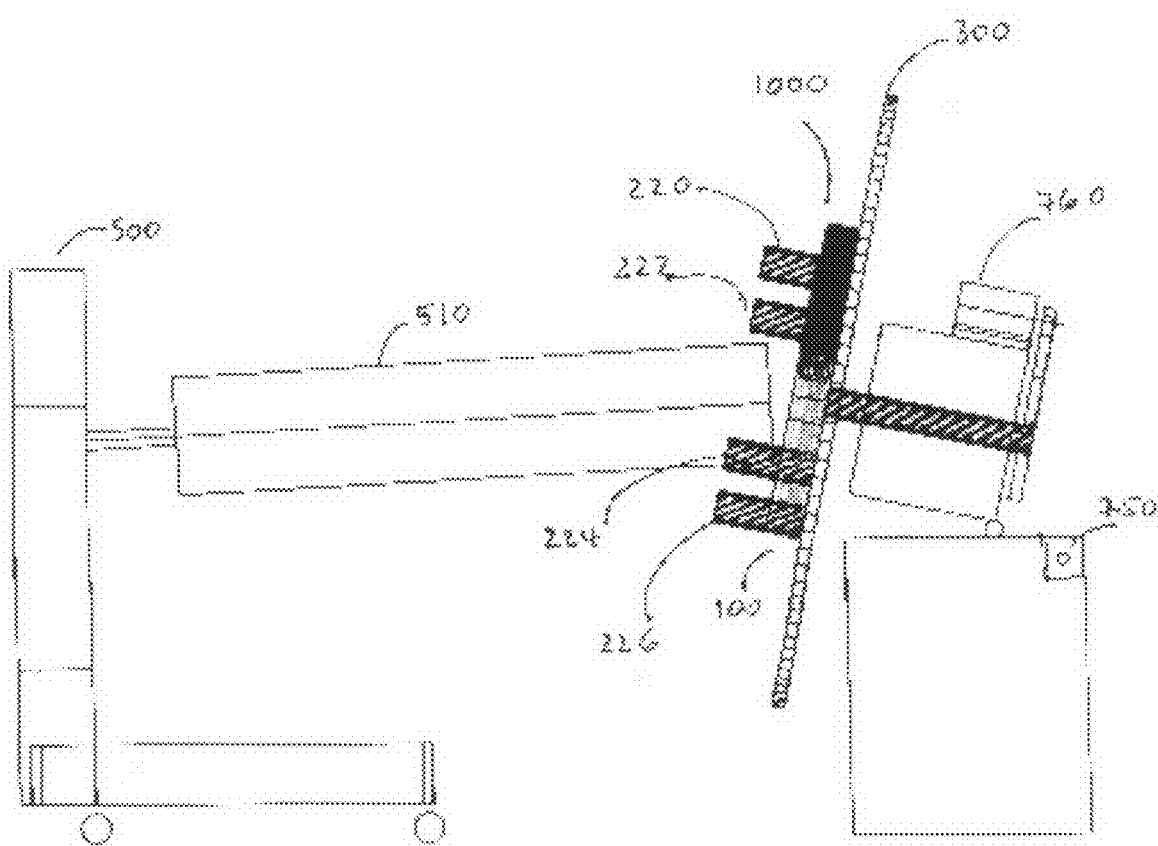
Figure 4:
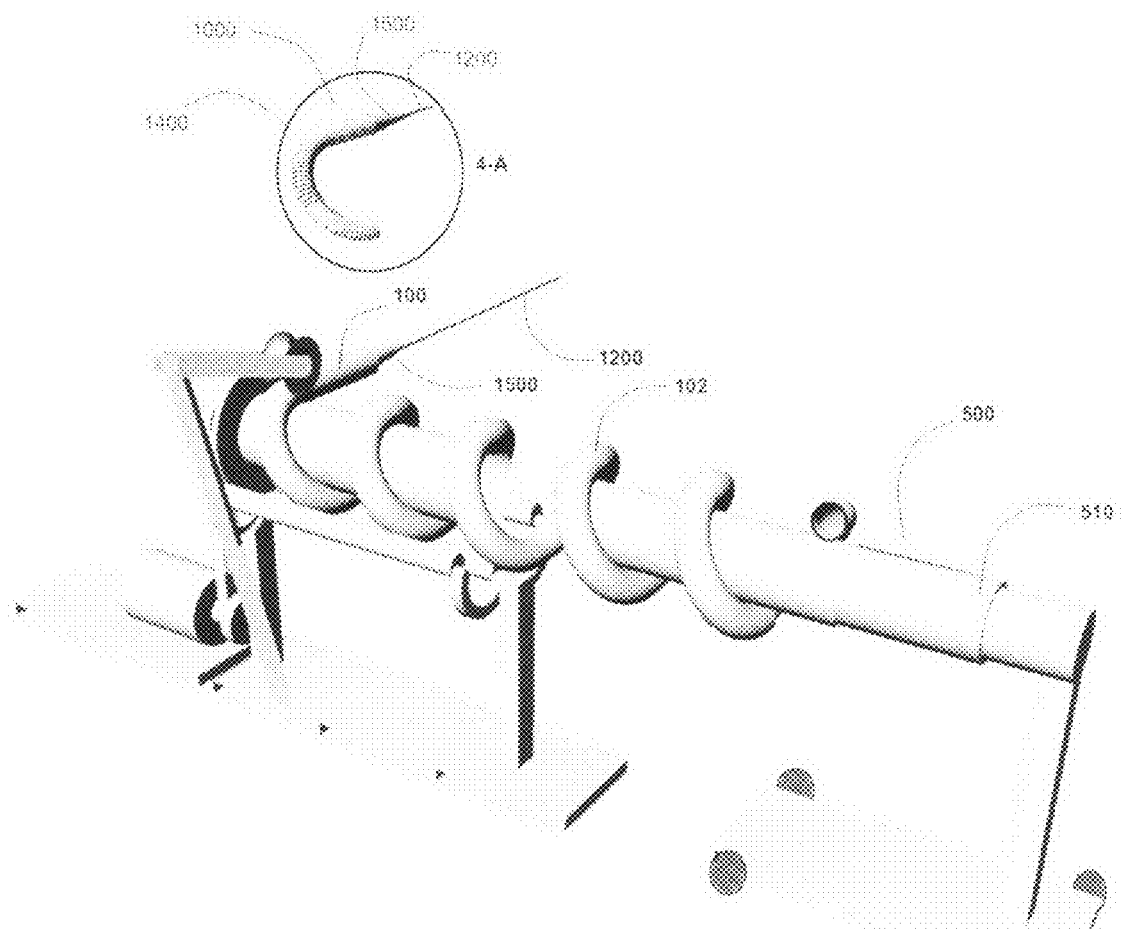
Figure 5:
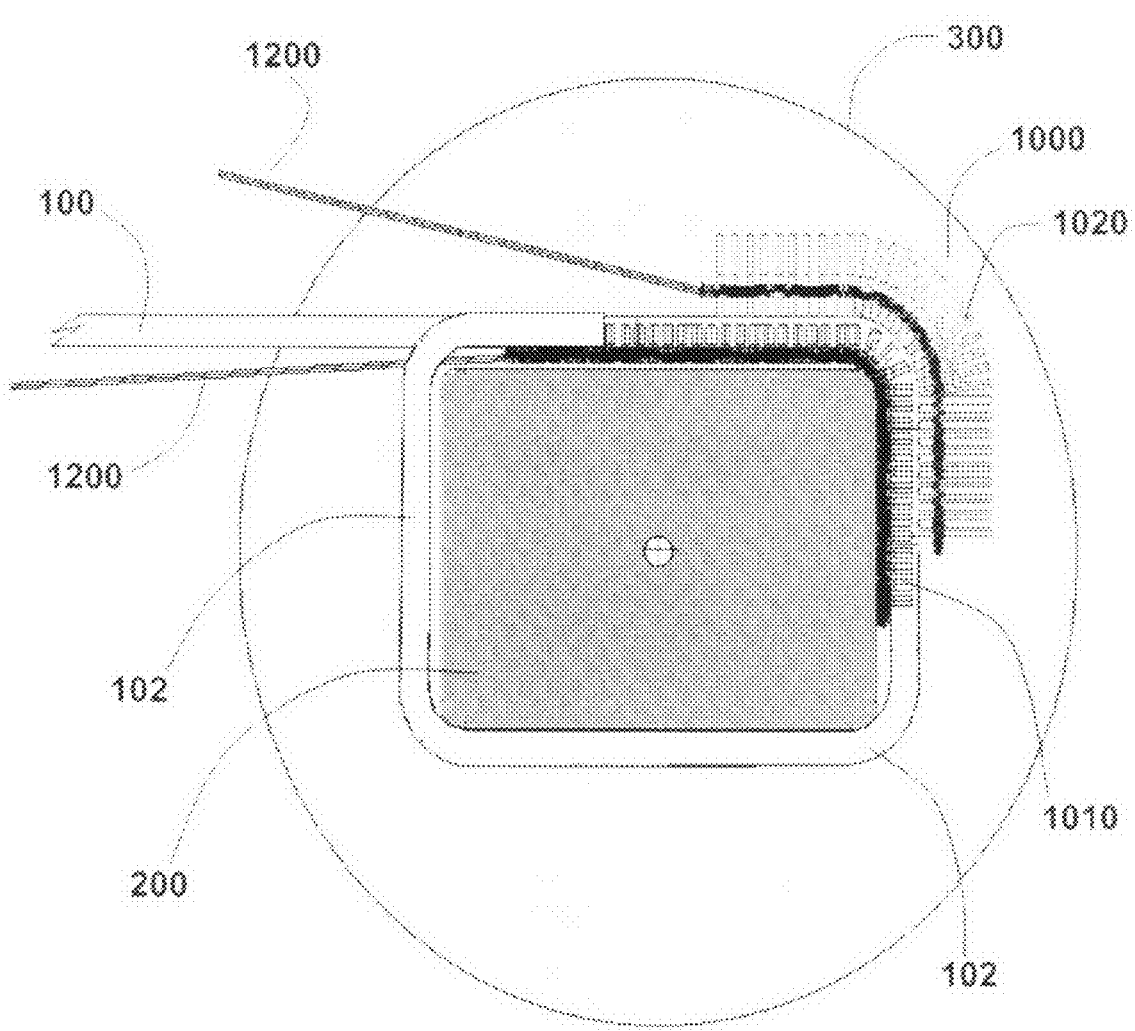
Figure 6:
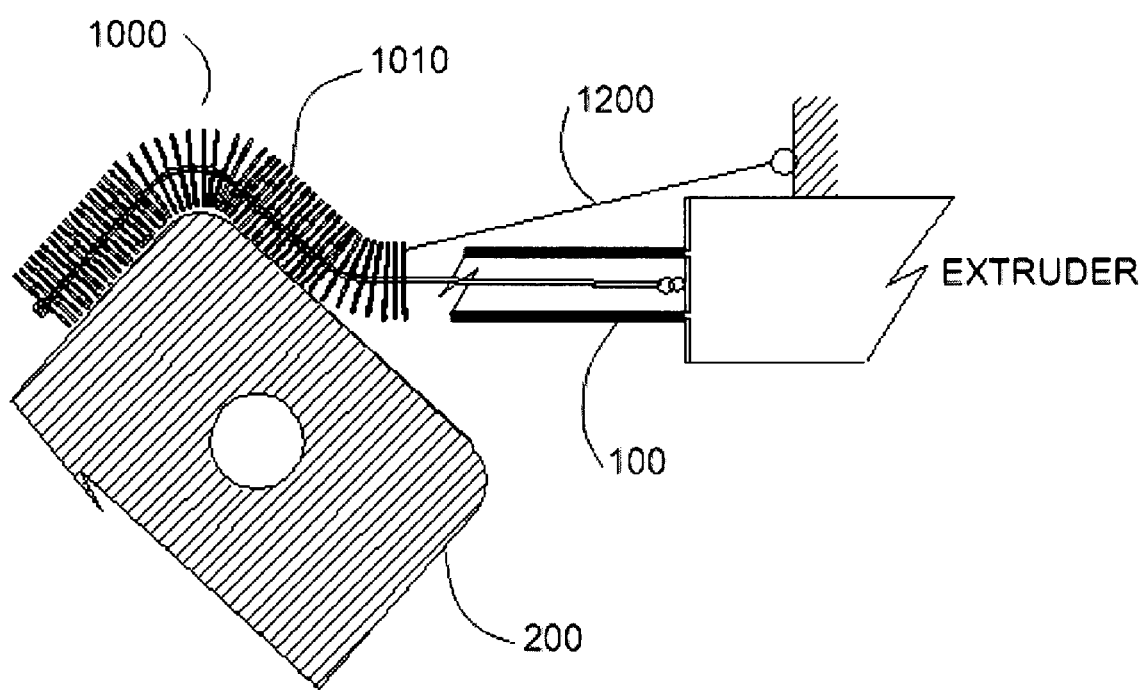
Figure 7:
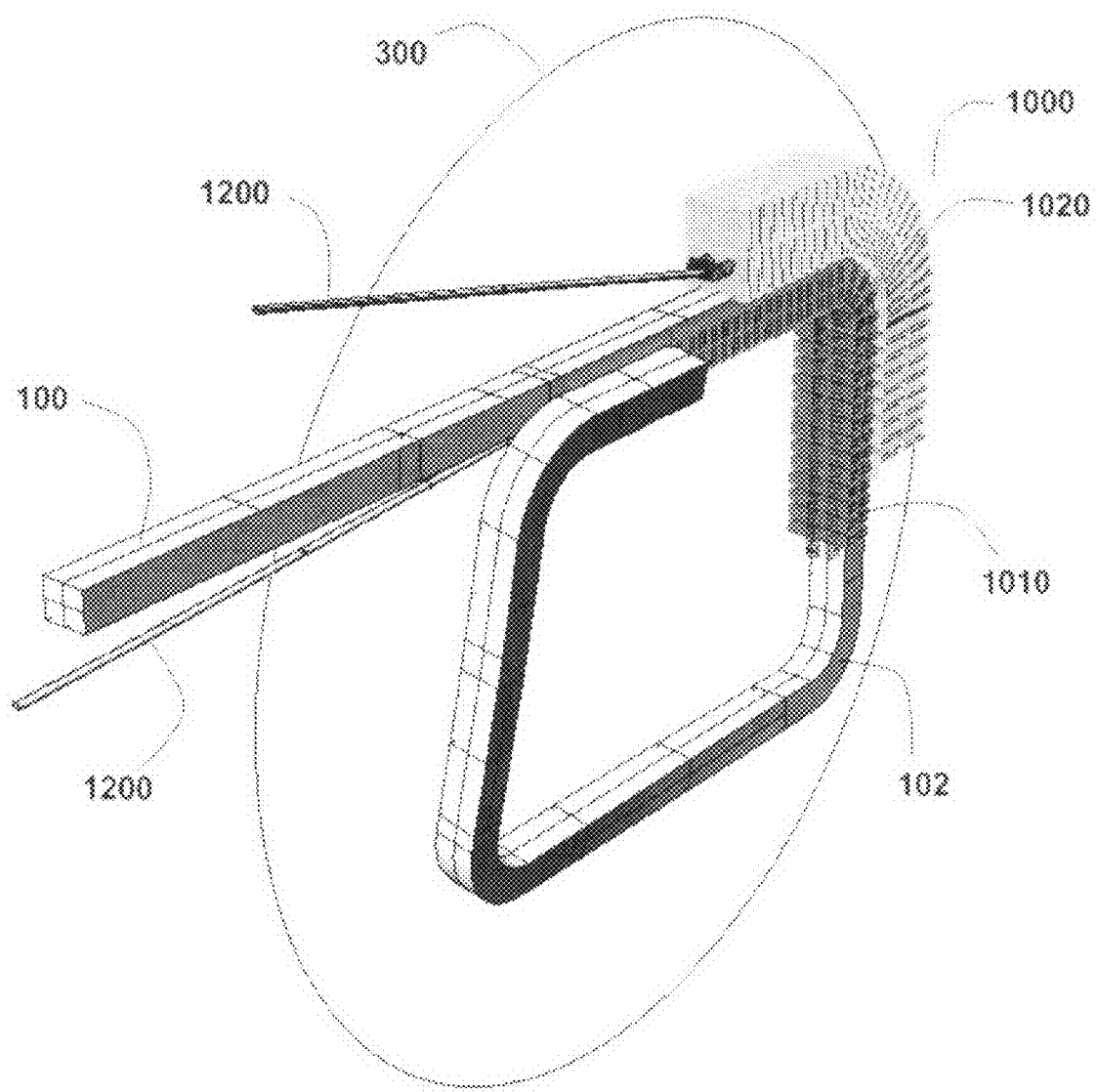
Figure 8:
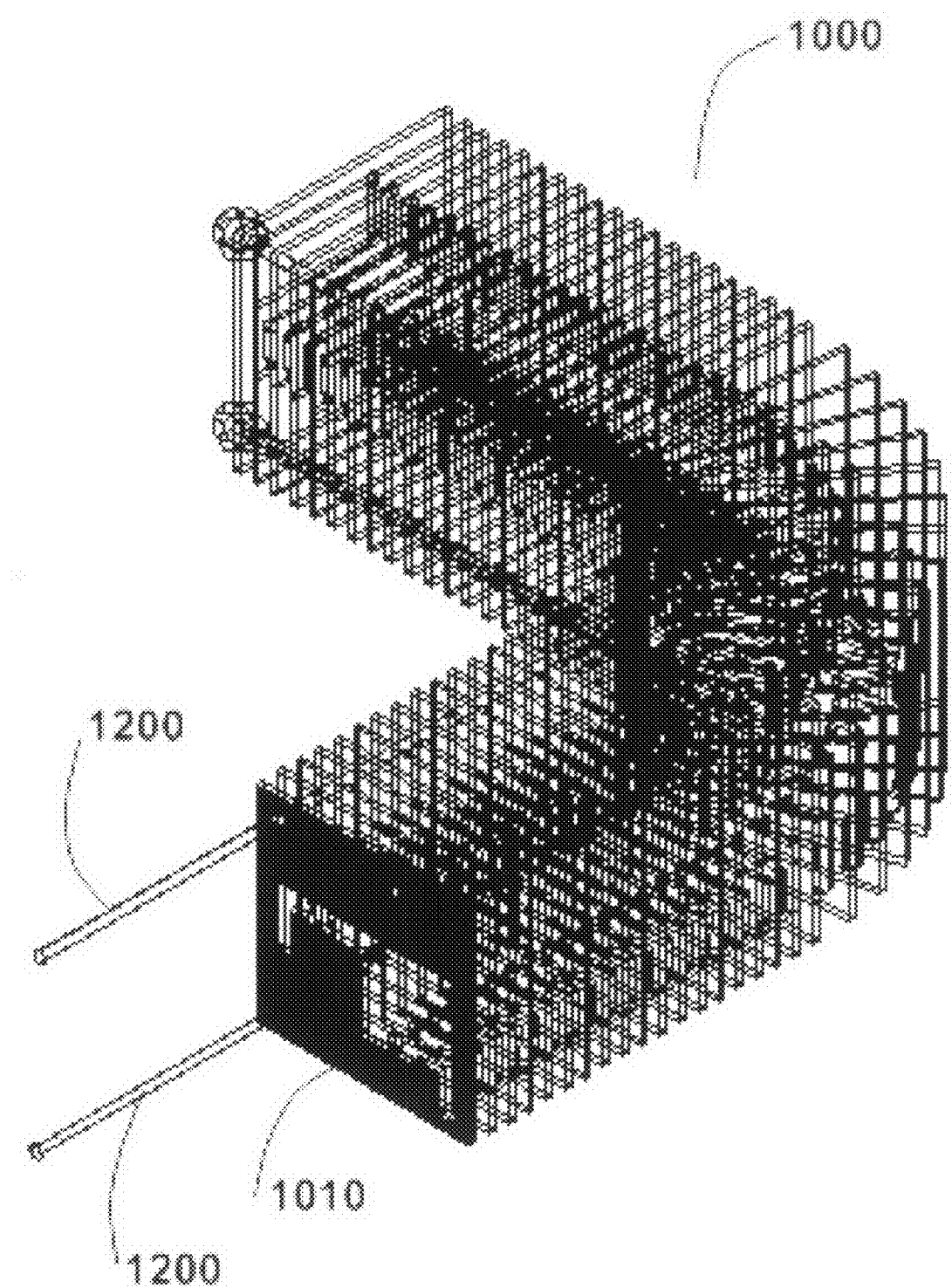
Figure 9:
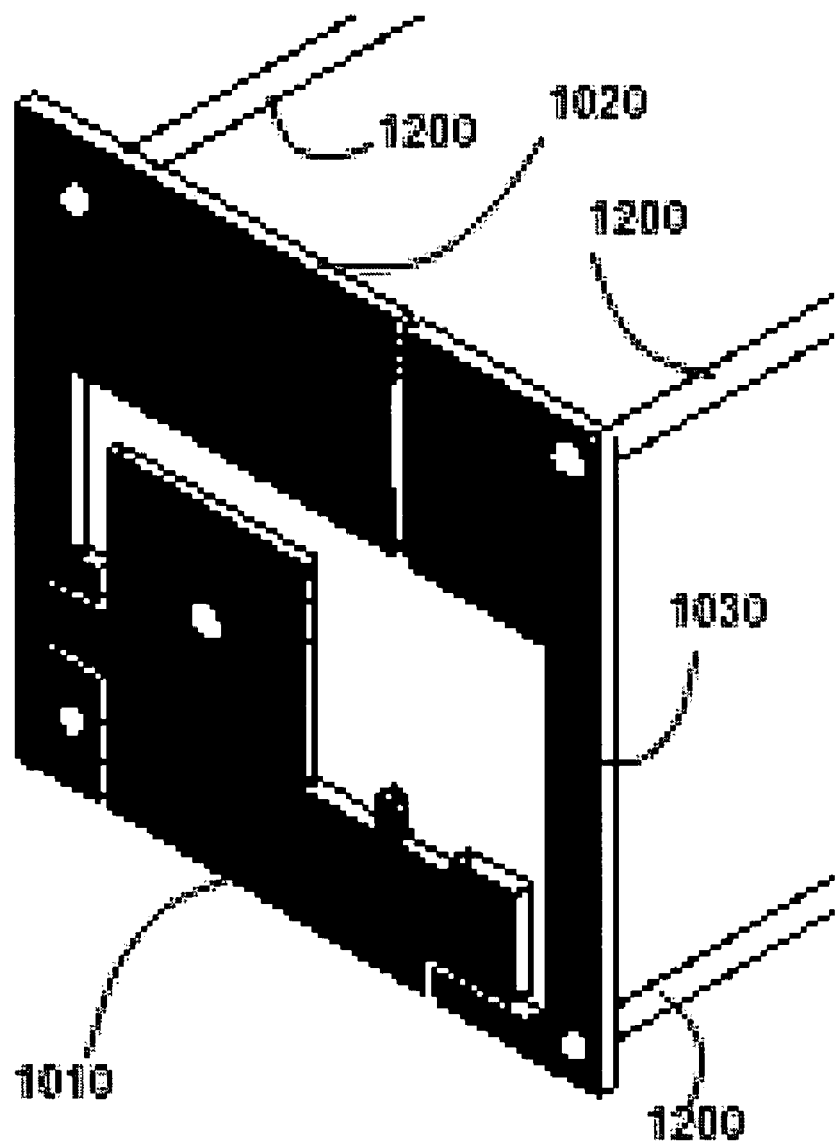
Figure 10:
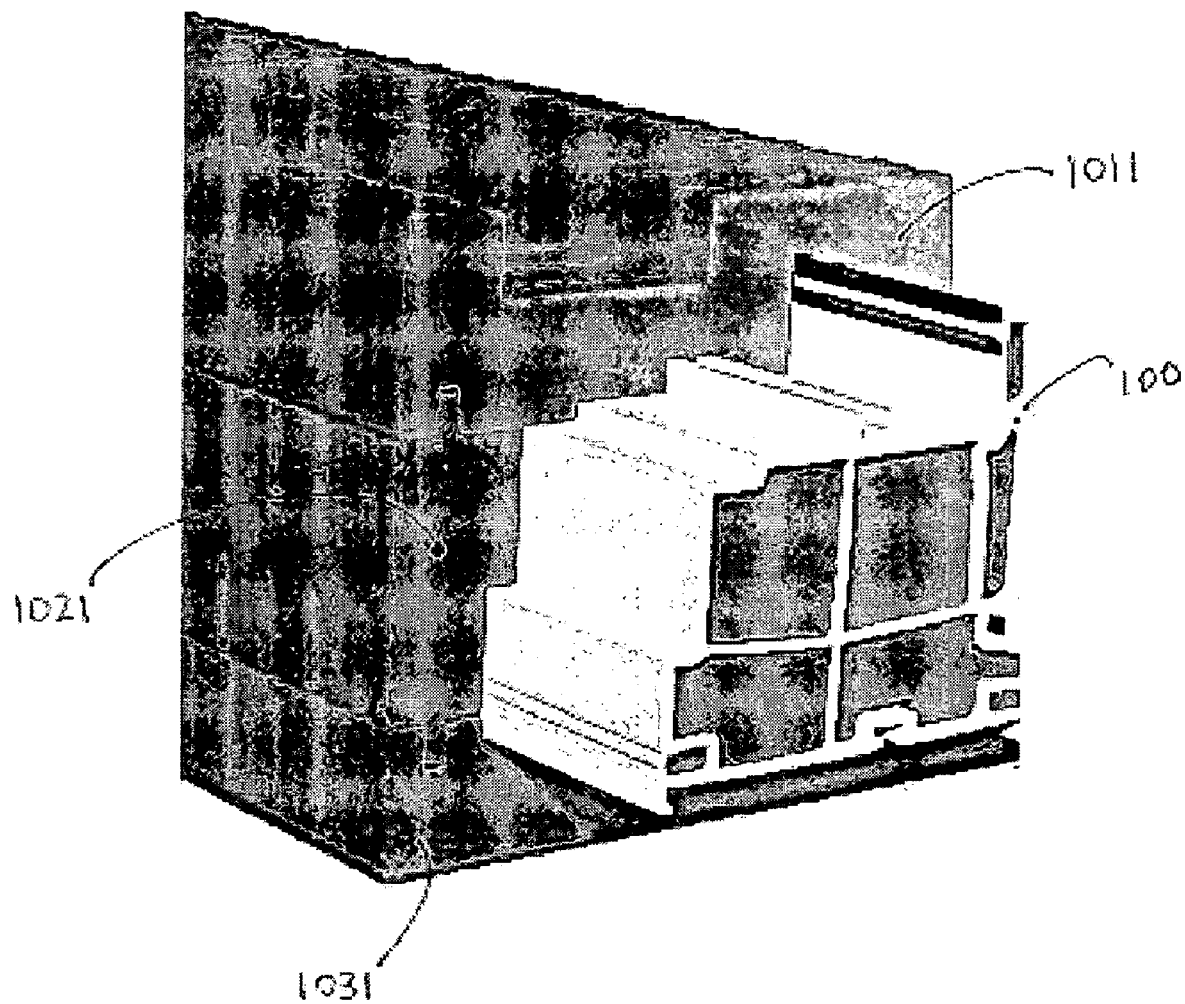
Figure 11:
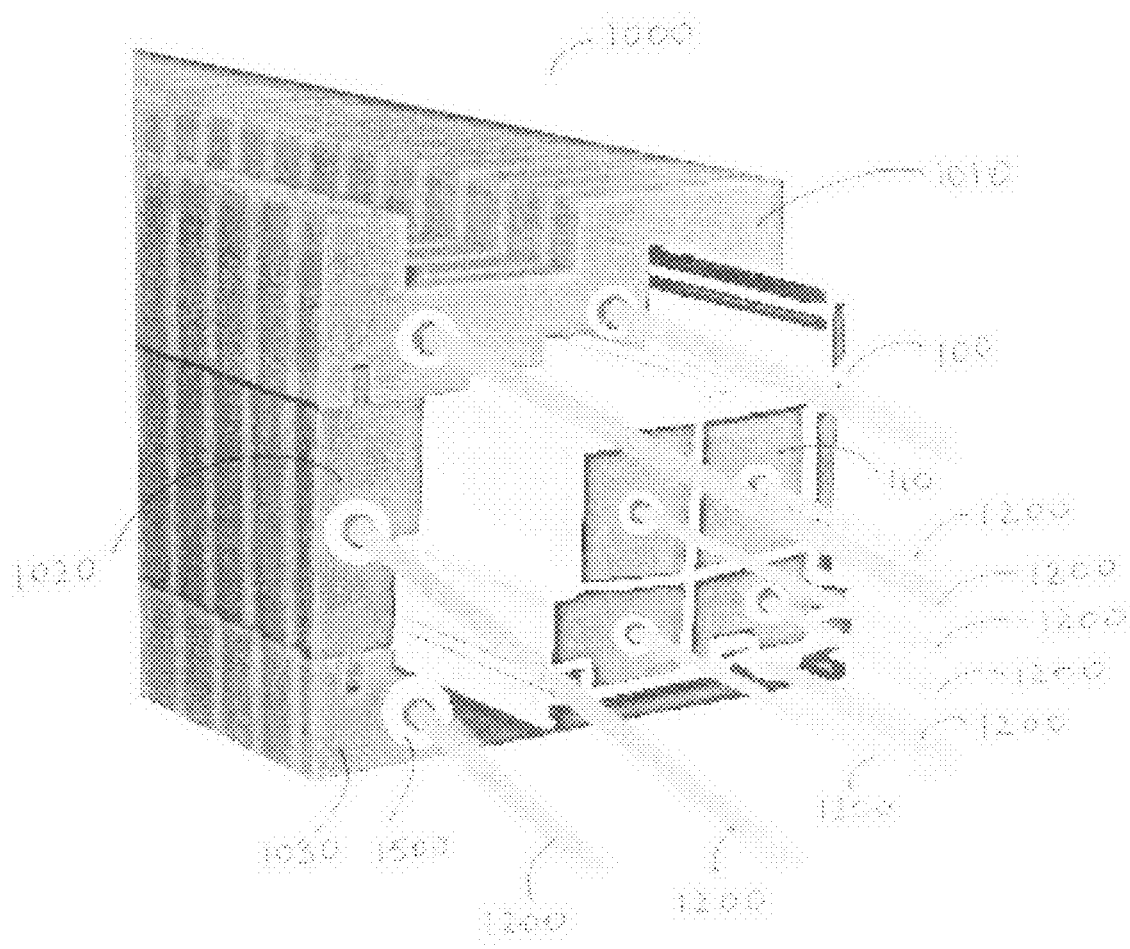
Figure 12:
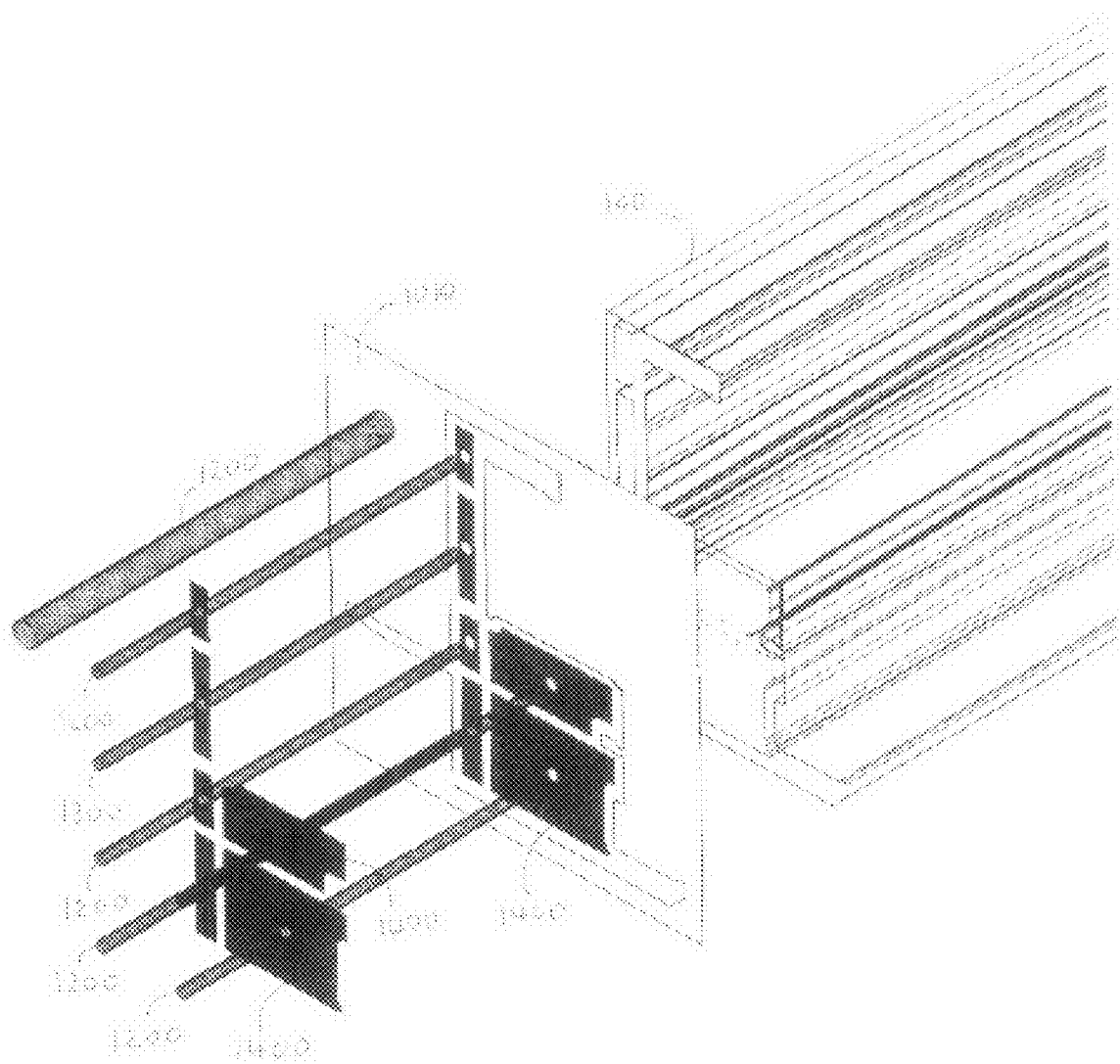
Figure 13:
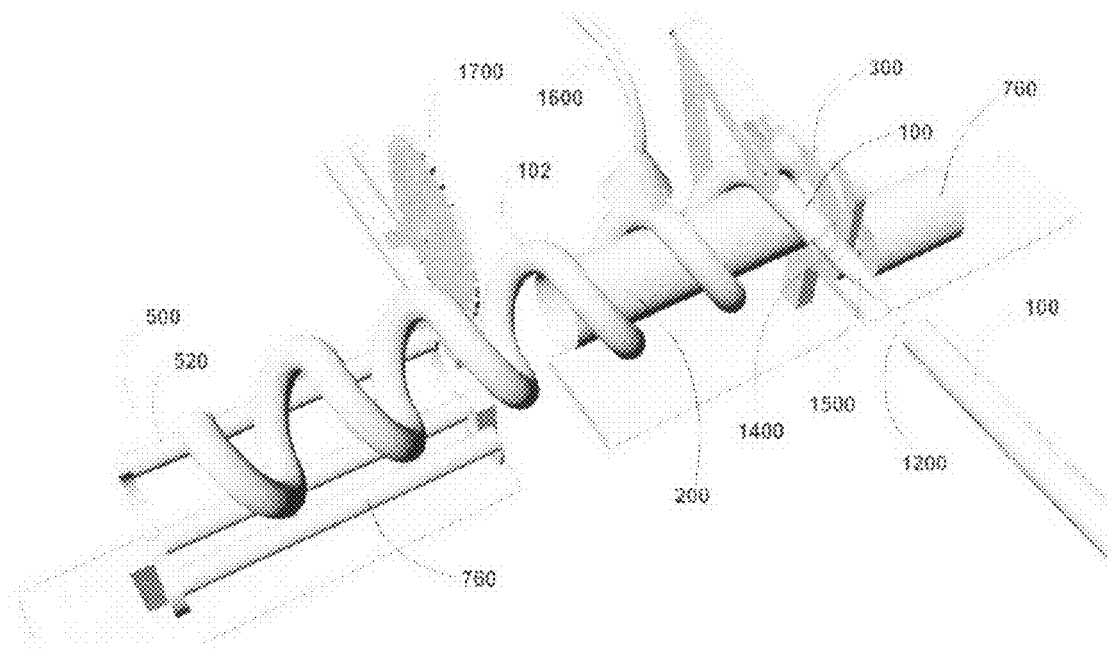
Figure 14:
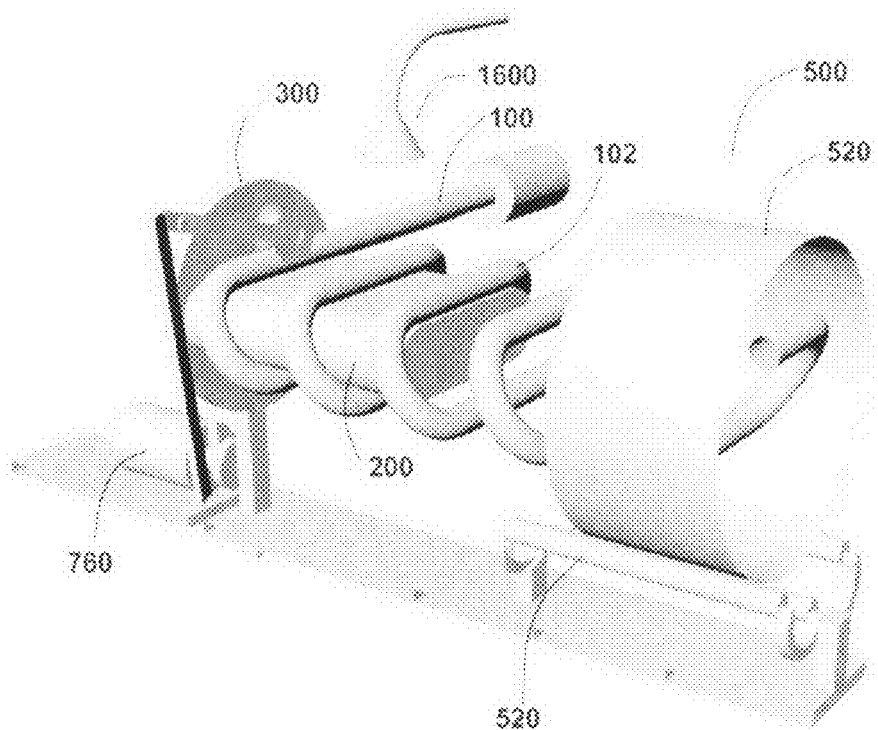
Figure 15:
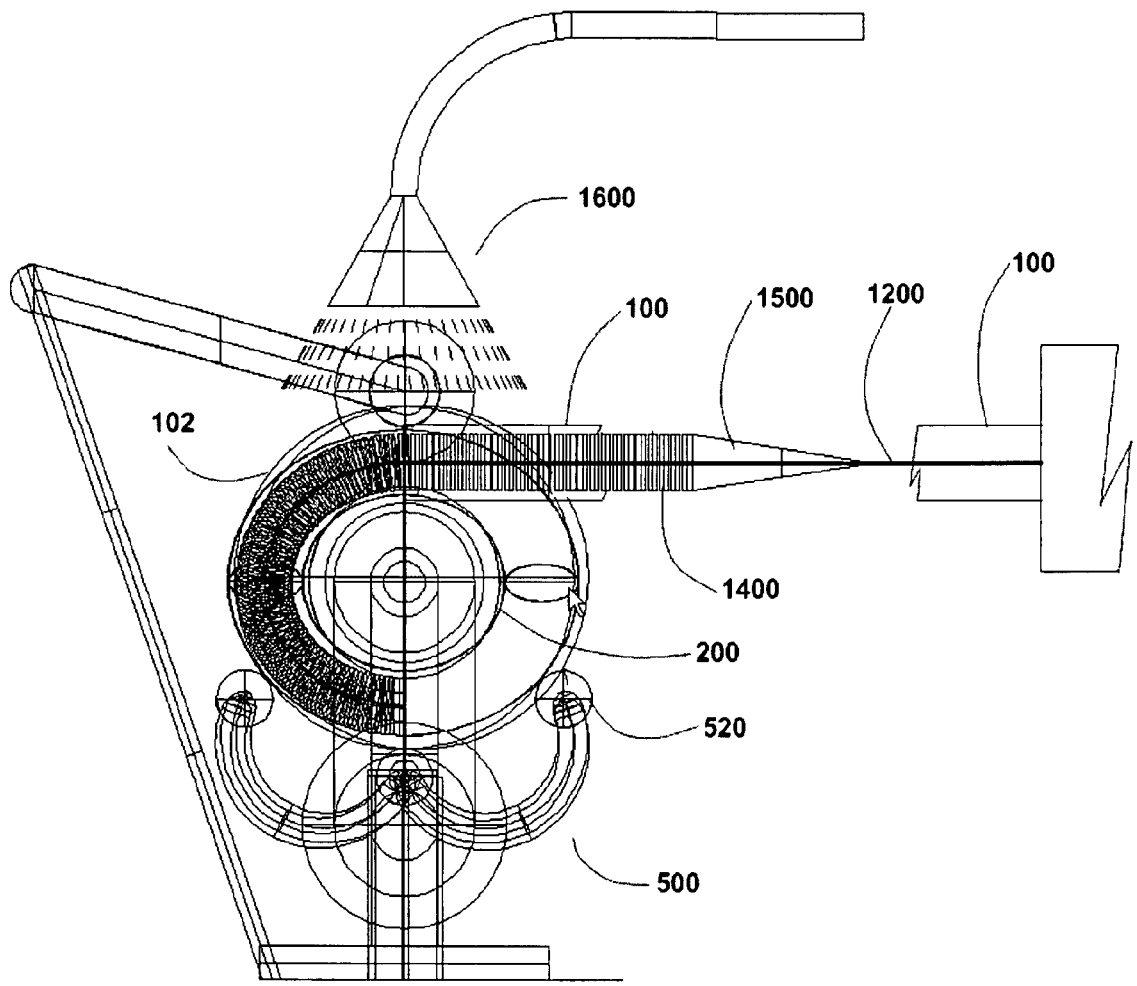
Figure 16:
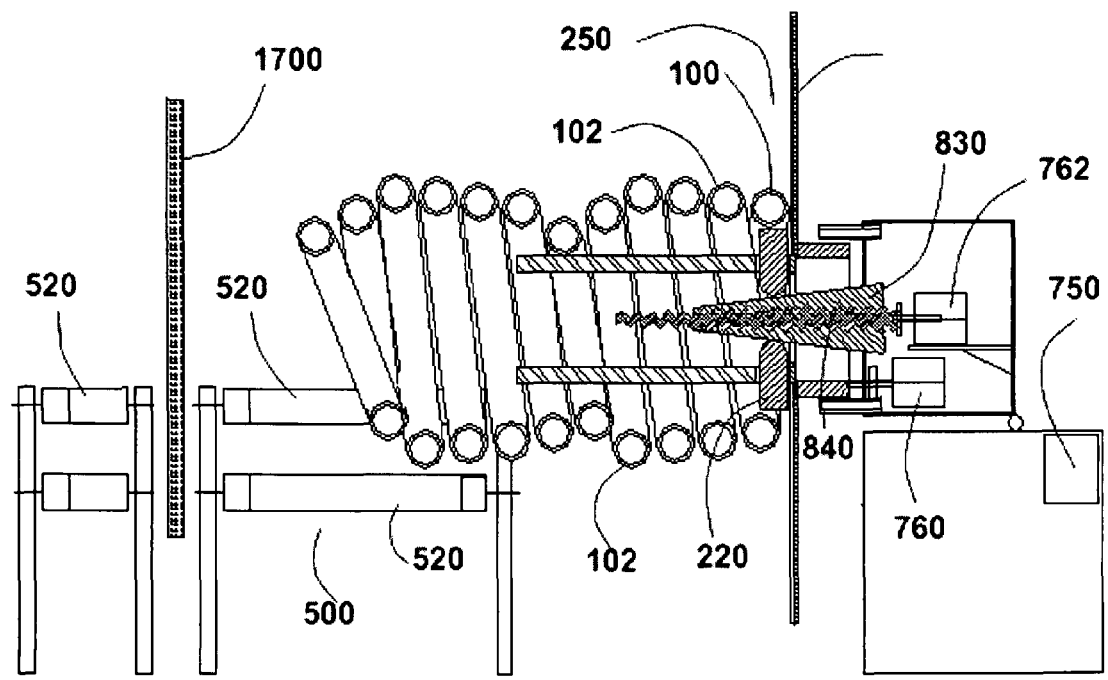
Figure 17:
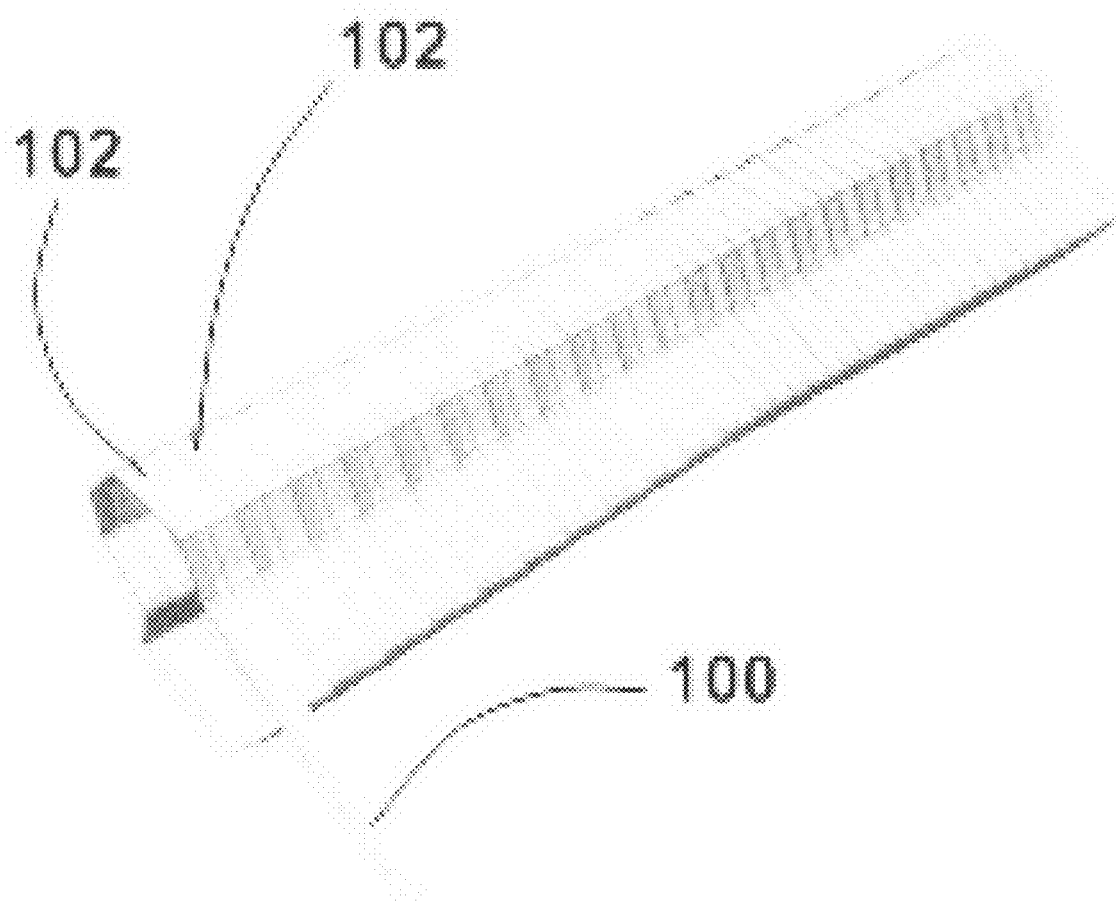
Figure 18A:
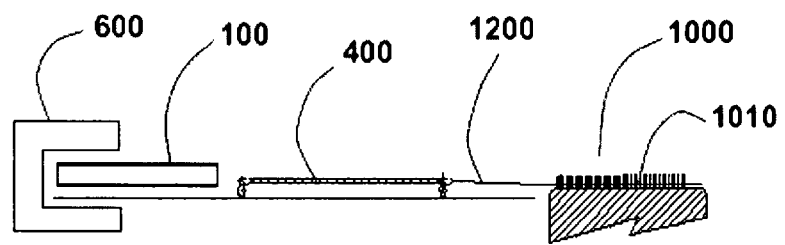
Figure 18B:
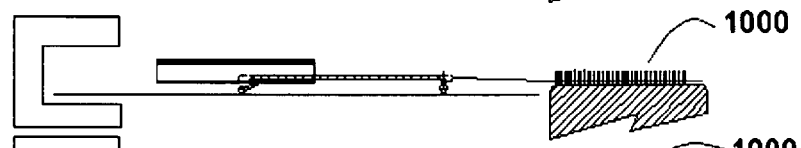
Figure 18C:
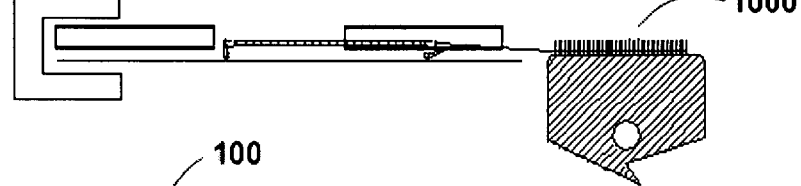
Figure 18D:
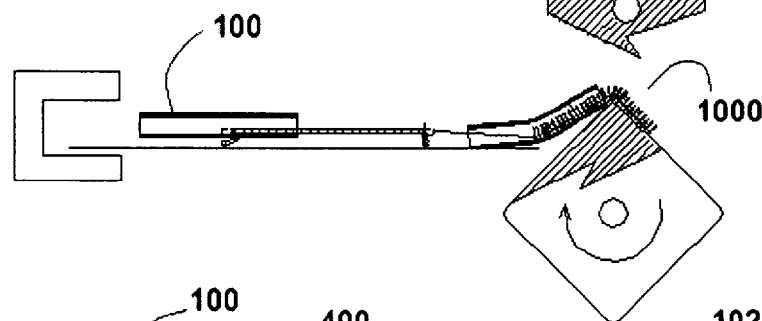
Figure 18E:
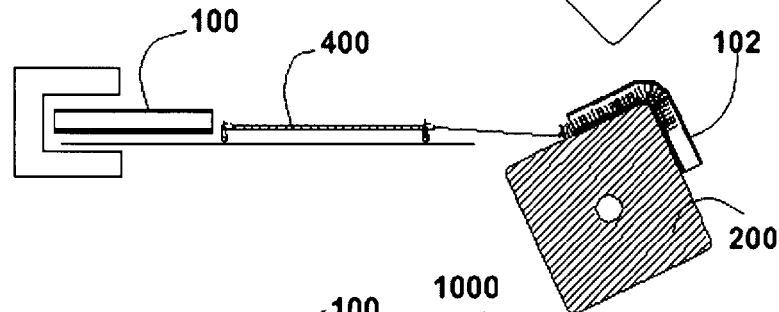
Figure 18F:
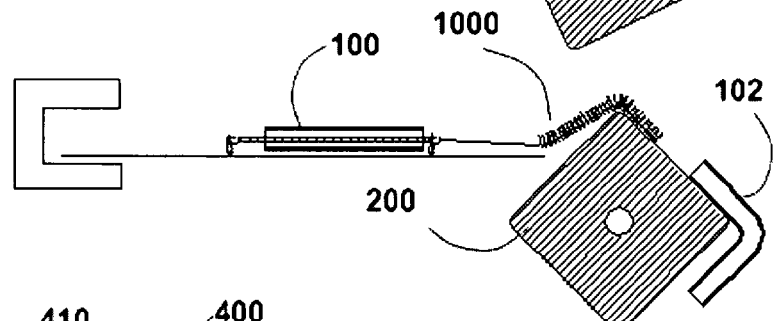
Figure 18G:
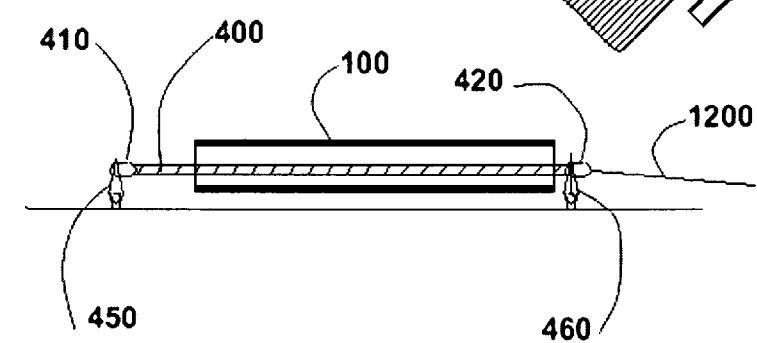

figures two-a, two-b, two-c, and two-d (labeled respectively FIGS. 2-A, 2-B, 2-C & 2-D in the drawings) are top views of the bending apparatus showing four different stages of how a profile is being winded around a vertical-axis mold laid over a horizontal turn-table.

figure three (labeled "FIG. 3" in the drawings) is a side view of a mold attached to an angle-variable turn-table cooperating with a mobile cantilevered roller;

figure four (labeled "FIG. 4" in the drawings) is a perspective view of a bending apparatus that includes a mold for forming a spiral-shaped pipe, the mold cooperating with a mobile cantilevered roller; a close-up view of a series of round finishing plugs held by a cable is also shown in bubble A;

figure five (labeled "FIG. 5" in the drawings) is a side view showing a profile engaged in-between an upper and a lower series of calibration plates, the lower series sliding over a mold outer contour and both series adopting freely the shape of one of the mold corners;

figure six (labeled "FIG. 6" in the drawings) is a top view of the bending apparatus of figure five cooperating with a mold attached to a horizontal-axis turn-table;

figure seven (labeled "FIG. 7" in the drawings) is a perspective view of the profile of figure five showing how two series of calibration plates shape the first corner of an incoming profile and how later the profile keeps that bended shape to form coil-like bodies;

figure eight (labeled "FIG. 8" in the drawings) is a perspective view of a series of calibration plates each with a central cavity forming collectively an inner flexible conduit functioning like a flexible mold;

figure nine (labeled "FIG. 9" in the drawings) is a calibration plate divided into three partial cooperating parts, each part including a series of holes for receiving elongate tethers;

figure ten (labeled "FIG. 10" in the drawings) is a perspective view of an elongate bending block made of three cooperating elongate flexible blocks made of heat-resistant plastic material for enveloping a profile which will be heated and bent by outside roller means;

figure eleven (labeled "FIG. 11" in the drawing) is a perspective view of an improved bending head shown in figure ten comprising of three cooperating series of calibration plates;

figure twelve (labeled "FIG. 12" in the drawings) is a perspective view of internal calibration plates held together by inner tethers;

figures thirteen and fourteen (labeled FIGS. 13 and 14 respectively in the drawings) are perspective views of another embodiment of the reception stand of the bending apparatus in which the shaped spiral pipe is being received over rollers;

figure fifteen (labeled "FIG. 15" in the drawings) is a front view of the bending apparatus of figure thirteen showing details of a series of round calibration plates also called finishing plugs;

figure sixteen (labeled "FIG. 16" in the drawings) is a side-view of a bending apparatus provided with a mold having radial movable parts for shaping profiles such as strips adhered together to form bodies having longitudinally-variable sizes;

figure seventeen (labeled "FIG. 17" in the drawings) is a perspective view of a variable size body produced by the bending apparatus of figure fifteen; and figures eighteen-a, eighteen-b, eighteen-c, eighteen-d, eighteen-e, eighteen-f, and eighteen-g (labeled respectively FIGS. 18-A, 18-B, 18-C, 18-D, 18-E, 18-F, & 18-G in the drawings) are schematic views showing how a hollow profile is shaped step-by-step into an elbow-shape profile in a post-extrusion process.

DETAIL DESCRIPTION OF THE PREFERRED EMBODIMENTS

Referring to the drawings wherein the showings are for purposes of illustrating the preferred embodiments of the apparatus and method only and not for purposes of limiting the same, the figures show F-shaped and O-shaped extruded profiles, preferably with perpendicular walls in cross-section, which should not be read as a limitation, but as a preference.

Protecting walls of a thermoplastic profile from collapsing during a bending and shaping process in a continuous manner is a challenge of the plastic industry.

In addition to this challenge, comes the need to manufacture on a continuous basis bended and shaped products inline with an extrusion process, so that the latent heat of the extrusion process can be used more efficiently. Still another challenge is to bend and shape profiles of complex cross-sectional dimensions and to do so in a cost-effective and timely manner.

Going beyond the needs of the plastic industry, the present application also discloses principles that cover not only the bending and shaping of thermoplastics and polymers but also other extrudable materials such as composites and organic compounds such as clay, or concrete-based materials. The amount of time and the methods used to solidify extradites varies. While thermoplastic materials need cooling and relatively little time to solidify, clay-type compounds need heating or drying and generally more time to cure. In the current application, the term conditioning is used to refer to either cooling, heating or drying of materials.

As shown in figure one, the shaping process disclosed involves the continuous pulling and winding of a profile 100 around a rotating mold 200. An operation that can be compared to a winch pulling a cable. Mold 200 itself, is attached to a turn-table 300 that rotates around an axis selected from the group of axis consisting of a horizontal axis as shown in figure one, a vertical axis as shown in figures two-a through two-d or an angle-variable axis as shown in figure three. The choice of the direction of the axis depends on the final size and shape of the product or body to be produced which in turn will dictate the size of the mold 200 and of the turntable 300 being used.

For bended profiles of short length, profile 100 does not require to be wound for a full turn around the mold. This applies, for example, to the manufacturing of elbows. In this case, profile 100 can be cut and the shaped product can be taken away just after the bending process has occurred and the bended profile 100 has been cooled or heated, depending on the nature of the profile's material. Similarly, closed-frame profiles can also be shaped and cut away just before a complete turn is performed, thus avoiding the need for a profile strand to lie over or besides a former strand.

For profiles that have some flexibility in the constituency of the profiles' materials, a small angular distortion is intentionally introduced in the manufacturing process during the winding action of the profiles around a mold so as to direct strands to lay side-by-side and allow for continuity not only in the production of the shaped profiles, but also allow continuity in the profiles' conditioning, cutting and removal of the processed profiles, thus avoiding interruption in the extrusion process. To manufacture looped objects, a batch of coils produced by the bending process are cut transversally allowing for two ends of a same coil to be joined together, disregarding the negligible misalignment created by laying profiles side-by-side rather than nose-to-nose. It should be noted that extruding linear profiles and shaping them into closed loops without passing through a coiling stage would be difficult and expensive to achieve.

Figure one shows a general layout of a bending apparatus 10 comprising a mold 200 attached to a turntable 300, multiple series of calibration plates 1000 held respectively together by tether means 1200, a conditioning system 1600, a cutting system 1700 and a receptacle system 500. In this arrangement, profile 100 coming from the extruder is drawn by the rotating force of the mold 200, itself rotated by the turntable 300. After a portion of profile 100 is winded around the outer contour of the mold 200, that portion is cooled (or heated) by the conditioner system 1600. In the embodiment of the method and apparatus shown in figure one, mold 200 has a horizontal outer contour and is attached to a vertical turntable 300 having also a horizontal axis.

Figures two-a through two-d show another embodiment of the method and apparatus in which a profile 100 is being winded around a mold 200 having a vertical outer contour. Mold 200 rests over a horizontal turntable 300 against which is applied a series of calibration plates 1000 held together by a tether means 1200. The series of shape-forming plates 1000 compels profile 100 to adopt the shape of the mold 200 outer contour, as mold 200 rotates over turntable 300.

Figure three shows another embodiment of the method and apparatus in which a mold 200 is attached to a turntable 300 which axis of rotation can be modified to rotate in an oblique angle. Turntable 300 is rotated by a variable-speed motor such as a servomotor or a step-motor 760 which variable speed of rotation may be synchronized with the constant speed of exit of profile 100 using a controller 750. Figures three and four also show another embodiment of the receptacle system 500 in which a movable cantilevered roller 510 cooperates with mold 200 to receive shaped profile 100.

Figure four shows more specifically how a profile 100 such as a hollow pipe is winded around a mold 100 and how shaped spirals are being removed using the cantilevered roller arm 510. The figure labeled 4-A—part of FIG. 4—shows a close-up view of a series of washer-like inner calibration plates 1400 or finishing plugs held by an inner tether or cable 1200. A cone-shaped plug 1500 helps center the pipe 100 around finishing plugs 1400.

In embodiments of the method and apparatus dealing with hollow profiles, an inner cable 1200 is attached to the central die of the extruder head around which profile 100 is extruded. The orientation of the angle in which the incoming extruded pipe 100 is wrapped around the mold 200 creates a natural pitch that helps move the shaped profile 102 forward over the mold 200 until the shaped profile 100 is moved out of the control of mold 200. The natural forward moving of the shaped profile 102 helps transfer the shaped profile 102 over a reception stand 500. As the number of profile coils accumulate over the mold outer contour, they are gradually forced to exit out of the control of the mold 200 until they can lay over a receptacle stand 500.

In one embodiment of the method and apparatus, the receptacle stand 500 is comprised of a single roller 510 provided for the shaped profile 102 to be transferred around said roller 510 which hangs like a cantilevered arm supported over a mobile trolley, as shown in figures three and four.

In another embodiment of the method and apparatus, the reception stand 500 is comprised of multiple rollers 520 provided for the shaped profile 102 to be transferred over the rollers 520 as shown in figures thirteen through fifteen.

Figures five and seven show how a series of lower calibration plates 1010 and a series of upper calibration plates 1020 cooperate to shape a profile 100. The manner in which plates 1010 & 1020 in each series of plates 1000 are flexibly connected together at the profile's respective lowest position vis-a-vis mold 200 provides the flexibility needed for these plates 1010 & 1020 to float and adopt freely any shape over which they rest upon. For molds 200 rotating around a horizontal axis, the force of gravity keeps plates 1010 & 1020 against the immediate longitudinal shape of the surface of the mold's 200 outer contour. More precisely, plates 1010 & 1020 cooperatively adopt the shape of the mold 200 first corner, while at the same time each plate 1010 & 1020 separately protects, plate-after-plate the profile 100 cross-sectional dimensions against deformation. For molds 200 rotating around a vertical axis such as shown in figures two-a trough two-d, the series of plates 1010 & 1020 are held flexibly against the mold outer contour by flexible means such as springs or rubber bungees.

Each plate 1010 & 1020 plays individually the role of a calibrator and collectively all plates 1000 in a series of calibration plates 1000 play together the role of a flexible mold that floats over the outer contour of a rotating mold 200 to adopt, dynamically, the mold 200 outer surface. It should be noted that the bended shape of the mold 200 closest corner to the extruder head at any given time during the mold rotation becomes the actual permanent longitudinal shape of the profile 100 after it has been cooled (for thermoplastic profiles). It should be also be noted that the series of calibration plates 1000 remains at a fixed distance from the extruder head but keeps floating up and down as it slides over the mold 200 outer contour. Whereas profile 100 winds over the mold 200 outer contour and therefore moves forward with the mold, profile 100 remains always in a sliding relationship with the calibration plates 1000. Thus, when a soft profile 100 is imparted with a fixed shape by calibration plates 1010 and cooled (or heated) to keep that permanent longitudinal and cross-sectional shape, the shaped profile 102 continues to move over and along the mold 200 outer contour to allow more time for the mold's curing.

Figure six shows a close-up detail of the mold 200 and more particularly brings attention to the mold 200 conical shape that allows for accumulated profile coils to slide freely over the mold 200 outer contour from the mold 200 highest perimeter to its lowest perimeter. Accumulated coils of a shaped profile 102 are gradually driven forward away from the mold 200 control until they exit from it and are transferred to a reception stand 500.

Figure eight shows a series of calibration plates 1010 each having a central cavity so that collectively all adjacent inner cavities in all plates 1010 form together an inner conduit of the same cross-sectional dimensions than that of the profile 100. Furthermore, all calibration plates 1010 in a same series are flexibly connected together with an elongate flexible element 1200 such as a spring 1200 providing to the series of plates 1010 enough flexibility so that said inner cavities act also as a flexible conduit. Thus, when the series of calibration plates 1010 rests on a moving surface, each plate adopts the detail topography of that surface at any given time and more specifically, in the case of a mold 200, each plate 1010 adopts individually the elevations and depressions of the mold 200 outer contour, while collectively adopting, in real-time, the general configuration of the surface of the mold 200 outer contour immediately underneath it.

Thus calibration plates 1010 play two distinctive roles: first they adopt the shape of the mold's outer contour immediately beneath the plates, at any given time during the rotation of the mold 200, and this for the purpose of imparting to the profile 100 the longitudinal shape of the plates 1010 inner conduit which in turn takes the shape of the mold outer contour 200; and second for calibration plates 1010 to maintain, at the same time, the profile cross-sectional dimensions substantially constant by having each plate 1010 individually and all plates collectively to act as calibrators for a selected profile configuration. Calibration of the profile 100 takes place whether sliding the profile 100 over a lower series of calibration plates 1010, sliding the profile 100 under calibration plates 1020 or having the profile 100 to pass through the inner conduit inside the series of calibration plates 1000. Generally, calibration takes place as long as calibration plates' inner cavity assumes the same cross-sectional dimensions as that of the profile 100.

Figure nine shows a close-up view of a calibration plate 1000 made of three cooperating parts 1010, 1020, & 1030. Each part 1010, 1020, & 1030 when replicated many times and flexibly joined by an elongate spring or a cable 1200 with a same group of parts forms together a series of calibration plates 1000.

Figure ten shows a bending system comprised of three cooperating high-temperature resistant plastic blocks 1011, 1021, & 1031 made of flexible material defining together a central-cavity for maintaining both the outer cross-sectional dimensions of a profile 100, while allowing longitudinal shaping during a bending process. These flexible blocks 1011, 1021, & 1031 can be injection molded, hand molded or extruded, and later machined. Using them is labor-intensive. To keep the hollow cores of a profile 100 substantially constant during bending, often insulation foam 110 is injected in the profile's hollow cavities. Other materials are also used to fill up a profile's 100 hollow cavities during bending, such as sand and other particulates. Air pressure or liquids are also used in cooperation with sealing methods to fill the hollow cavities.

Figure eleven shows an improvement made to the prior art shown in figure nine. Instead of three cooperating blocks defining a cavity, an embodiment of the present invention provides three cooperating series (or an appropriate number depending on the configuration of profile 100) of individual partial plates called herein calibration plates 1010, 1020, & 1030. Optional spacers 1500, such as washers, may also be added in-between the calibration plates 1010, 1020, & 1030 which can be manufactured rapidly and cost-effectively by a laser cutting machine if made of metals such as steel or aluminum, they can also be simply punched or made with a water-jet cutter if made preferably of semi-rigid materials such as plastics of various hardness. Each series of calibration plates 1010, 1020, & 1030 is held flexibly together by a set of tethers such as cables 1200 or for smaller profiles 100 by elongate springs 1200 depending on the size of the extruded profile 100 being shaped.

Whereas the flexible blocks 1011, 1021, & 1031 as shown in figure nine require manual labor to fit around each pre-cut length of profile 100 before use. The automatic and continuous bending apparatus of the method and apparatus requires only short set-up time before continuous production can resume. In addition, fabricating calibration plates 1010, 1020, & 1030 and holding them together by threading them with a set of tethers, such as springs and cables 1200, is efficient and inexpensive.

Furthermore, the method and apparatus uses the same approach whether for maintaining constant the cross-sectional dimensions of the profile 100 outer surface by using external calibration plates 1010, 1020, & 1030 or for maintaining constant the inner cores by using internal calibration plates 1400, also referred in the pipe plastic industry as finishing-plugs 1400.

The combination of external calibration plates 1010, 1020, & 1030, finishing plugs 1400, spacers 1500 (when used), and of respective cables or springs 1200—that hold the respective plates flexibly together—form what is referred to in the present application as a bending head 1000.

Figure sixteen shows another embodiment of a bending apparatus, which has a size-variable mold assembly 250 having radially movable parts for producing profiles 100 of longitudinally-variable shapes. The mold assembly 250 includes two motors. A first motor 760 for rotating the turn-table 300 and a second motor 762 for driving a screw 840 that moves forward or backward a cone-shaped cam 830 which in turn pushes jaws 220 enabling change in the radial size of the mold's 250 outer contour. Variations of the size of the mold 250 may take place concurrently with the rotation of the mold 250, thus providing a continuous process for manufacturing size-variable coils made of bended profiles 100.

Uniformly shaped bulky bodies can be made by joining and adhering side-by-side coils of profiles 100 of the same size and shape. However, it is possible to create non-uniform three-dimensional bodies (see figure seventeen) with the size-variable mold 250 of the method and apparatus shown in figure sixteen. For example, extruding a flat-shape profile 100 where its edge is bonded with a former coil 102 of a similar flat-shape profile 102 during a shaping process of the profile will result into an object similar to the object shown in figure seventeen. Optionally, profile's 100 side-edge may include an interlocking feature for easier connection or adherence to adjacent coils made of the same profile 102 configuration.

In another embodiment of the method and apparatus, calibration plates 1010, 1020, 1030, & 1400 may also be used in post-extrusion processes as shown in figure eighteen. Thus, bending a continuous supply of fixed length linear profiles is made possible by using the calibration plates 1010, 1020, 1030, & 1400, with the exception that an additional source of heat 600, a conveyor and a hooking system are needed.

While a profile is in the inline process, the apparatus and method used for thermoplastic profiles benefits from the latent heat generated from the extruder machine that originally produced the profile 100. In a post-extrusion process, an external source of heat 600 such as an oil bath, electrical heaters, or natural gas is required.

Furthermore, bending and shaping in a post-extrusion process a continuous supply of fixed-length hollow profiles 100, which include one or multiple inner cores 110, is challenging. To maintain constant each profile's inner cross-sectional dimensions during bending, inner calibration plates 1400 or finishing-plugs 1400 must be inserted in a continuous manner into the core of the profile. This challenge is further exasperated by the need to hold these inner finishing plugs 1400 inside the profiles by inner cables 1200. The above challenge means that cables 1200 must be secured to an outside hook means 450 & 460 and hooked and unhooked intermittently, without letting go cable 1200. To achieve this, a set of needle-like rods 400 having loops means 410 are used in one embodiment of the apparatus and method.

The set of figures eighteen-a through eighteen-f show how threading of a linear hollow profile 100 by a long needle-like rod 400 is achieved. More specifically, figure eighteen-g shows a close-up view of how hooks 450 & 460 cooperate intermittently with loops 410 & 420. The needle-like rod 400 has a first and a second loop means 410 and 420 similar to elongate holes located respectively at rod 400 front-end 410 and at rod 400 back-end 420; rod 400 is configured to enter and exit profile 100 inner core(s) while holding and preventing the series of finishing plugs 1400 from being driven away; the two hook means 450 & 460 cooperate in male-female relationship respectively and intermittently with front-end loop 410 and then with back-end loop 420; when profile 100 passes over and covers first loop 410, the second loop 420 latches to hold positively rod 400 by hook 460. Vice-versa, when profile 100 covers second loop 420, first loop 410 latches to hold positively rod 400 by hook 450.

As described in the above post-extrusion process, to bend a heated profile 100 that includes one or multiple inner cores or cavities, and this in order to produce a bended thermoplastic product such as a short or long sweep elbow, a U-shaped product or a closed frame-like product, the method requires that first profile 100 be heated before being threaded into the needle-type rod 400 which function is to make sure that the cable 1200 is holding the internal calibration plates 1400 or finishing plugs 1400 at a fixed distance during threading, so that the finishing plugs 1400 are not pulled away by profile 100. After profile 100 envelops fully or partially the series of finishing-plugs 1400 and depending on the profile's position over the rotating mold 200, profile 100 is gradually pulled, bent, and wrapped around the outer contour of mold 200 while finishing plugs 1400 maintain the profile cross-sectional dimensions constant. Finally, the shaped profile 100 is cooled and transferred to a reception stand 500.

Shaped profiles 102 are cut by a moving cutting system 1700 such as a saw 1700, a laser cutter or a water jet cutter to cut bent or coiled profile 100 into various length portions. A batch of coiled profile 100 can be cut into a wide range of lengths, each responding to the needs of a particular product—for example when a coil is cut into smaller portions, sharp or sweep elbows can be obtained such as shown in figure eighteen-f, when the two ends of a full length coil are joined together, closed loops or frames are formed. When coils are adhered side-by-side to each other's edges, a bulky-shape product is created as shown in figure sixteen.

The method and apparatus has been described with reference to several preferred embodiments. Modifications and alterations will occur to others upon reading and understanding the preceding detailed description. It is intended that the present application of the method and apparatus be construed as including all such modifications and alterations insofar as they come within the scope of the appended claims or the equivalents thereof.

The invention claimed is:

1. An apparatus for variably shaping an extruded profile inline with an extrusion process, said apparatus comprising:
    a mold with an outer contour;
    said mold is attachable to a rotatable turntable;
    a series of rectangular-shape calibration plates attached flexibly on said plates' same edges;
    each of said plates having a central cavity of same outer cross-sectional dimensions as said profile;
    all of said cavities cooperating collectively to form a flexible conduit;
    a tether holding one end of said series of plates;
    said edges of said series of plates sliding over said rotating mold's outer contour; and
    said apparatus is configured, when in operation, such that said profile is first drawn through said flexible conduit and that said profile is second wound around said rotating mold for shaping longitudinally and variably said profile by said conduit.

2. An apparatus for variably shaping an extruded profile inline with an extrusion process, said apparatus comprising:
    a mold with an outer contour;
    said mold is attachable to a rotatable turntable;
    multiple series of partial calibration plates; said partial plates in same series attach flexibly together on said plates same edge;
    said plates have partial cavities that collectively define a flexible conduit of same cross-sectional dimensions of said profile;
    multiple tethers respectively holding one end of each said series of partial plates;
    edges of said series of plates closest to a mold's outer contour slide over the rotating mold; and
    said apparatus is configured, when in operation, such that said profile is first drawn through said flexible conduit and that said profile is second wound around said rotating mold for shaping longitudinally said profile by said conduit.

3. The apparatus of claim 1, further comprising:
    a conditioning system;
    a cutting system;
    a reception stand;
    said conditioning system for cooling and heating a shaped profile;
    said cutting system for cutting said shaped profile into sections for delivery over said reception stand.

4. The apparatus of claim 1, wherein said mold's outer contour is provided with radial moveable parts activated by a drive means for changing configuration of said mold's outer contour, causing variable longitudinal shaping of elongate profiles.

5. The apparatus of claim 4, wherein said variable longitudinal shaping of elongate profiles is managed in real-time.

6. The apparatus of claim 1, wherein said apparatus configures a profile into forms selected from the group consisting of elbow-shape bodies, U-shape bodies, closed frame-like bodies wherein the two ends of a coiled profile strand are joined together, spiral-shape bodies, three-dimensional bodies wherein adjacent coiled profile strands are bonded or interlocked together to form a tubular surface, size-variable three-dimensional bodies, and any combination thereof.

7. The apparatus of claim 1, wherein an axis that said turntable rotates around is selected from the group consisting of horizontal axes, oblique axes and angle-variable axes.

8. The apparatus of claim 1, wherein said calibration plates are made of materials selected from the group consisting of semi-rigid materials, polymeric materials, rubber, plastic, silicone, metal, glass, fiber-glass, ceramics, and any combination thereof.

9. The apparatus of claim 1 wherein flexible attachment of calibration plates on one-side of said plates, said plate one-side including said plate same edge, is achieved through a securing means selected from the group consisting of:
    incorporating a set of holes next to said plate one-side and passing through flexible elongate elements;
    incorporating an elongate slot next to said plate one-side and passing through a flexible elongate flat element;
    adhering to said plate same edge a flexible tape made of metal foil, polymer sheets, cloth, fiberglass and tapes of the like; and
    fusing to said plate same edge a flexible sheet of fusible material.

10. The apparatus of claim 1, wherein said apparatus further comprising:
- at least one series of adjacent internal calibration plates having same internal core cross-sectional dimensions of a profile;
- all of said internal calibration plates in a same series attach flexibly together;
- an internal tether holding one end of said series of internal calibration plates; and
- an end of said internal tether attaches respectively to an associated internal head die of an extruder that extruded said profile.

11. The apparatus of claim 1, wherein said profile includes at least one inner closed core and said apparatus further comprises:
- at least one series of adjacent internal calibration plates having the same internal core cross-sectional dimensions as said profile;
- said internal calibration plates in a same series being attached flexibly together;
- at least one internal tether holding one end of said series of internal calibration plates and an other end of said tether is attached respectively to an associated internal head die of an extruder that is calibrated to extrude said profile;
- at least one needle-type elongate rod having respectively a first and a second loop at a front-end and back-end of said rod;
- said rod configured so that said rod threads said profile's inner core, which is threaded by said tether, which in turn holds said internal calibration plates loosely together and in place;
- said first and second loop is selected from the group of needle-type elongate holes;
- at least one first and second group of hooks alternatively latches with said loops when said profile is not standing in-between said respective hook and respective loop;
- said hooks are selected from the group of finger-type grips;
- said apparatus is configured so that continuous shaping of said profile is achieved by first moving forward said profile, then heating said profile while it enters said plates and is laced by said rod holding said tether that in turn holds said series of internal calibration plates, so that said profile's sectional dimensions are maintained constant while said profile is longitudinally shaped; and
- said apparatus is configured so that afterwards a shaped profile is cooled and released from said calibration plates.

12. An apparatus for variably shaping in a post-extrusion process a straight thermoplastic extruded profile of a predefined length, said apparatus comprising:
- a heating system for heating said profile;
- a cooling system for cooling said profile after said profile has been shaped;
- a transport means for moving forward said profile;
- a mold with an outer contour;
- said mold attachable to a rotatable turntable;
- a series of rectangular-shape calibration plates attached flexibly on said plates same edge;
- each of said plates having a central cavity of same outer cross-sectional dimensions as said profile;
- all of said cavities cooperating collectively to form a flexible conduit;
- a tether securing one end of said series of plates; and
- said series of plates configured for sliding over said rotating mold outer contour and said flexible conduit configured to allow for said profile to be drawn through said flexible conduit before said profile winds around said rotating mold for shaping longitudinally and variably said profile.

13. A method for variably shaping an extruder profile inline with an extrusion process, said method comprising:
- a mold with an outer contour;
- said mold attaches to a rotatable turntable;
- a series of generally rectangular-shaped calibration plates attached flexibly on said plates same edge, each of said plates having a central cavity of same outer cross-sectional dimensions as said profile;
- said cavities cooperating collectively to form a flexible conduit;
- a tether holding one end of said series of plates;
- said edges of said series of plates sliding over said rotating mold outer contour; and
- said profile first being drawn through said flexible conduit and second being winded around said rotating mold for being longitudinally and variably shaped by said conduit.

14. A method for variably shaping an extrudable profile, inline with an extrusion process, said method comprising:
- a mold having an outer contour;
- said mold attaches to a rotatable turntable;
- multiple series of partial calibration plates;
- said partial plates of a same series attached flexibly together on a same edge;
- each of said partial plates having a partial cavity;
- said partial cavities defining collectively a flexible conduit of the same cross-sectional dimensions as said profile;
- multiple tethers each respectively holding one end of said series of partial plates;
- plate edges in said series of partial plates closest to said mold outer contour to slide over said rotating mold, causing said flexible conduit to follow upward and downward movement of said mold outer contour as said mold rotates;
- said profile slides through said flexible conduit to receive the longitudinal shape of said mold outer contour while maintaining substantially constant said profile's cross-sectional dimensions;
- cooling said profile after it has been shaped; and
- cutting said shaped profile into portions for delivery over a reception stand.

15. The method of claim 14, wherein said mold's outer contour is provided with radially moveable parts activated by a drive means for changing configuration of said mold outer contour; and whereby creating profile bodies of longitudinally-variable sizes.

16. The method of claim 15, wherein said profile includes at least one inner closed core and said method further comprises:
- at least one series of adjacent, internal calibration plates having the same internal core cross-sectional dimensions as said profile;
- all of said internal calibration plates in a same series being attached flexibly together;
- at least one internal tether to hold one end of said series of internal calibration plates and said tethers other end attached respectively to an associated internal head die of the extruder that extruded said profile;
- at least one needle-type elongate rod each having respectively a first and a second loop means at said rod's front-end and back-end;
- said rod is configured for said profile's inner core to be threaded by and exited from;

said rod holds said internal tethers, which hold said internal calibration plates in place;

said first and second loop means selected from the group of needle-type elongate holes; at least one first and second group of hooks alternatively latch with said rod loop means when said profile is not standing in-between said respective hook and respective loop means;

said hook means being selected from the group of finger-type grips;

continuous shaping is achieved by said profile first moving forward, then heating said profile while it enters external calibration plates and is being laced like a needle by rods holding tethers that in turn hold series of internal calibration plates, so that both internally and externally, the profile sectional dimensions are maintained constant while only longitudinal shaping takes place; and afterwards cooling said shaped profile and releasing said profile from said calibration plates.

17. A post-extrusion method of variably shaping a straight thermoplastic extruded profile, wherein said method comprises:

a heating system for heating said profile;

a cooling system for cooling said profile after said profile has been shaped;

a transport means for moving forward said profile;

a mold, with an outer contour, said mold attachable to a rotatable turntable;

a series of generally rectangular-shape calibration plates attached flexibly on said plates same edge, each of said plates having a central cavity of same outer cross-sectional dimensions as said profile;

said cavities cooperating collectively to form a flexible conduit;

a tether securing one end of said series of plates; and said series of plates sliding over said outer contour of said mold, which is rotating and the profile being drawn through said flexible conduit before being winded around said rotating mold for being longitudinally and variably shaped by said conduit.

* * * * *